United States Patent [19]

Okada et al.

[11] Patent Number: 4,607,293
[45] Date of Patent: Aug. 19, 1986

[54] MAGNETIC RECORDING AND REPRODUCTION SYSTEM

[75] Inventors: Yoshinori Okada, Katsuta; Kuniaki Miura, Ibaraki; Isao Fukushima, Katsuta, all of Japan

[73] Assignee: Hitachi, Ltd., Tokyo, Japan

[21] Appl. No.: 556,047

[22] Filed: Nov. 29, 1983

[30] Foreign Application Priority Data

Nov. 29, 1982 [JP] Japan ................ 57-207603

[51] Int. Cl.[4] ............................................ A04N 5/782
[52] U.S. Cl. ................................. 358/328; 358/343; 360/19.1; 360/21
[58] Field of Search .............. 360/19.1, 21, 84, 20, 360/30, 64; 358/343, 310, 330, 340, 328

[56] References Cited

U.S. PATENT DOCUMENTS

| | | | |
|---|---|---|---|
| 3,715,481 | 2/1973 | Harr | 360/19.1 |
| 3,846,819 | 11/1974 | Warren | 360/84 |
| 3,925,816 | 12/1975 | Hihara | 360/19.1 |
| 4,197,562 | 4/1980 | Hikuya | 360/64 |
| 4,328,518 | 5/1982 | Kawata | 360/64 |
| 4,490,754 | 12/1984 | Kluth | 360/19.1 |

FOREIGN PATENT DOCUMENTS

| | | | |
|---|---|---|---|
| 87114 | 8/1983 | European Pat. Off. | 360/19.1 |
| 77012 | 6/1980 | Japan | 360/19.1 |

*Primary Examiner*—Alan Faber
*Attorney, Agent, or Firm*—Antonelli, Terry & Wands

[57] ABSTRACT

A magnetic recording and reproduction system of a helical scanning type provided with audio heads which rotate together with the rotary video heads so that the frequency-modulated audio signal is recorded by the audio heads on the video track on which the video signal will also be recorded. The audio signal is recorded first on the video track, and then the video signal is recorded over the record of the audio signal, whereby the audio signal has an expanded frequency band thereby to provide an improved sound quality.

3 Claims, 11 Drawing Figures

MAGNETIC RECORDING AND REPRODUCTION SYSTEM

The present invention relates to a magnetic recording and reproduction system which records the video signal and audio signal on the magnetic tape and reproduces the signals from the tape, and more particularly to a magnetic recording and reproduction system in which the audio head for recording and reproducing the audio signal is rotated together with the video head so as to record and reproduce the audio signal on the video track.

In the helical scanning magnetic recording and reproduction system, a plurality of video heads are mounted on a rotary cylinder to form a rotary head for recording the video signal askew on the magnetic tape which is wound spirally for more than 180 degrees around the cylinder. On the other hand, the audio signal is recorded by the fixed audio head along the longitudinal direction at the upper or lower edge section of the magnetic tape.

The recent improvement in the magnetic head and magnetic tape has brought enhanced recording and reproducing characteristics for the video signal. This allows the achievement of desired S/N ratio using less amount of tape, whereby the recording density can be increased by operating the system at a lower tape speed. In this case, recording and reproduction of the video signal by the rotating video head do not significantly affect the relative speed of the video head against the magnetic tape, and the video signal can be recorded and reproduced without impairing the S/N ratio. On the other hand, however, the relative speed of the fixed audio head against the magnetic tape falls as the tape is fed at a lower speed, resulting in a deteriorated quality of the audio signal. Namely, the frequency band of the recorded audio signal narrows in proportion to the decrement of the tape speed, resulting in a deteriorated clearness and S/N ratio of the audio signal.

A new recording system is being attempted, in which the frequency-multiplexed audio and video signals are recorded concurrently on the video track of the magnetic tape by the rotary video head. In this case, the audio signal is recorded and reproduced by the video head, and thus the audio signal can have a wider frequency band, and the sound quality is improved. In the household magnetic recording and reproduction apparatus, however, the luminance signal and chrominance signal are separated from the color picture signal, so that the luminance signal operates on the carrier signal to be frequency-modulated so as to produce the frequency-modulated luminance signal, and the chrominance signal operates on the chrominance subcarrier to have its frequency converted to a frequency band below the lower sideband of the frequency-modulated luminance signal, and the transformed luminance signal and chrominance signal are frequency-multiplexed for recording. The new recording system is designed such that the audio signal operates on the audio carrier signal to be frequency-modulated and the frequency-modulated audio signal is recorded by being placed in a band between the lower sideband of the luminance signal and the upper sideband of the chrominance signal.

However, in the common household magnetic recording and reproduction apparatus, where TV signals for one field are recorded on one video track formed on the magnetic tape, the cylinder for winding the magnetic tape cannot have an enlarged diameter, and gain of the relative speed between the video head and magnetic tape is limited. Accordingly, there is a limit of the frequency band for recording the video signal, and therefore, the lower sideband of the luminance signal and the upper sideband of the chrominance signal overlap each other. On this account, there is no space of band for placing the frequency-modulated audio signal between the upper sideband of the chrominance signal and the lower sideband of the luminance signal. An alternative idea for placing the audio signal between the luminance and chrominance signals by shifting the carrier frequency of the luminance signal to a higher band is not desirable because of compatibility with the conventional magnetic recording and reproduction systems.

It is an object of the present invention to provide a magnetic recording and reproduction system which enables high quality recording and reproduction of the audio signal when the magnetic tape is fed at a lower speed for increasing the recording density.

According to the present invention, video heads and audio heads are mounted on a tape guide drum so that the video heads and audio heads rotate together, the video heads recording the video signal askew on the magnetic head, while the audio heads recording the frequency-modulated audio signal on the video track where the video signal will be recorded. The video heads and audio heads are made to have different azimuth angles of gap so that the interference between the video signal and audio signal is minimized.

The present invention will be apparent from the following detailed description taken in conjunction with the accompanying drawings, in which.

Figure 1:
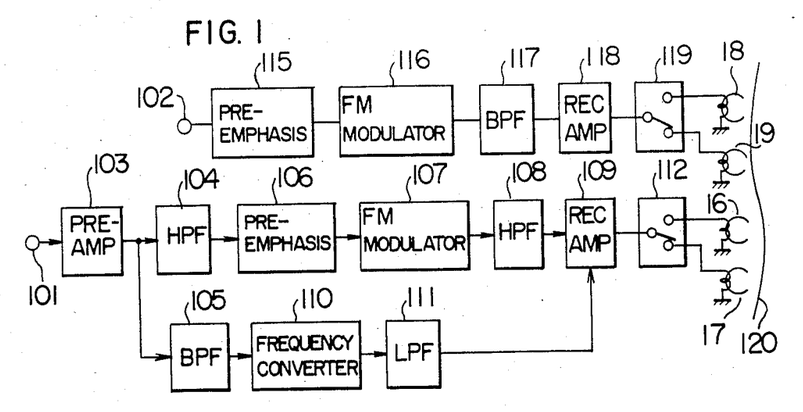
FIG. 1 is a block diagram showing an embodiment of the recording circuit in the inventive magnetic recording and reproduction system.

The magnetic recording and reproduction system of the present invention will now be described by way of an illustrated embodiment. FIG. 1 is a block diagram showing an embodiment of the recording circuit included in the inventive magnetic recording and reproduction system. In the figure, an input terminal 101 receives the video signal of a color television signal, while an input terminal 102 receives its audio signal. The video signal at the input terminal 101 is amplified by a preamplifier 103 and fed to a high-pass filter 104 and band-pass filter 105. The high-pass filter 104 separates the luminance signal from the supplied video signal, while the band-pass filter 105 separates the chrominance signal from the video signal. The luminance signal extracted by the high-pass filter 104 is fed to a pre-emphasis circuit 106 so that its high frequency components are amplified. Then, the luminance signal is fed to a frequency modulator 107 which performs frequency modulation for the luminance carrier signal, and the luminance signal is transformed into a signal which is the frequency-modulated luminance carrier signal. The frequency-modulated luminance signal is fed to a high-pass filter 108, by which unwanted components in the lower frequency band are eliminated, and then the signal is supplied to a recording amplifier 109.

On the other hand, the chrominance signal extracted by the band-pass filter 105 is fed to a frequency converter 110. The frequency converter 110 has a local oscillator and operates to mix the signal generated by the local oscillator with the chrominance subcarrier of the chrominance signal, so that the frequency of the chrominance subcarrier is converted into a frequency below the lower sideband of the frequency-modulated luminance signal. Then, the chrominance signal shifted to a lower frequency band is fed through a low-pass filter 111 to the recording amplifier 109.

The recording amplifier 109 sums the luminance signal supplied through the high-pass filter 108 and the chrominance signal supplied through the low-pass filter 111 to form a frequency multiplexed signal and, after performing amplification, supplies the multiplexed signal through a head switching circuit 112 to two video heads 16 and 17. The video heads 16 and 17 constitute a rotary head mounted on the guide drum which guides a magnetic tape 120, and the two heads are used alternately for every two fields for recording the frequency-multiplexed luminance and chrominance signals on the magnetic tape 120.

The audio signal received at the input terminal 102 is fed to a pre-emphasis circuit 115 so that high frequency components are amplified. The pre-emphasized audio signal is supplied to a frequency modulator 116, by which the audio carrier signal is frequency-modulated in accordance with the audio signal. The audio carrier signal has a center frequency which is selected to have a frequency band between the lower sideband of the luminance signal and the upper sideband of the chrominance signal. In actual, however, there is no marginal band enough to place the audio carrier signal between the upper sideband of the chrominance signal and the lower sideband of the luminance signal, and therefore the center frequency of the audio carrier signal may preferably be selected in the lower sideband of the luminance signal. The audio signal frequency-modulated by the frequency modulator 116 is fed through a band-pass filter 117 so that unwanted higher and lower frequency components are eliminated, and then supplied to a recording amplifier 118. The recording amplifier 118 amplifies the audio signal and supplies the signal through a head switching circuit 119 to two audio heads 18 and 19.

The audio heads 18 and 19 are mounted on the tape guide drum, so that they constitute the rotary head in cooperation with the video heads 16 and 17. The two audio heads 18 and 19 receive the audio signal alternately for every two fields of video signal, and record the frequency-modulated audio signal on the same video tracks on which the video signal is recorded by the video heads.

Figure 2:
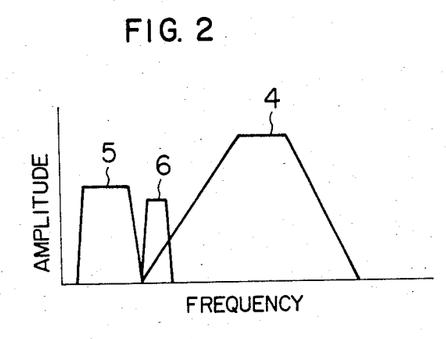
FIG. 2 is a frequency spectrum diagram of the video and audio signals recorded by the inventive magnetic recording and reproduction system.

FIG. 2 shows the frequency spectra of the video signal and audio signal recorded on the video track of the magnetic tape. The frequency-modulated luminance signal 4 and the chrominance signal shifted to a lower band 5 are recorded by the video heads, and the frequency-modulated audio signal 6 is recorded by the audio heads. The audio signal 6 is placed in a band between the luminance signal 4 and the chrominance signal 5, and in this case the audio signal 6 is placed in the lower sideband of the luminance signal 4 in order that the audio signal does not interfere with the chrominance signal.

Figure 3:
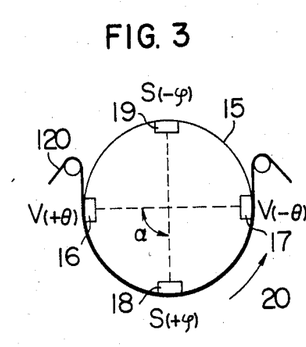
FIG. 3 is a diagram showing the disposition of the video heads and audio heads of the inventive magnetic recording and reproduction system.

FIG. 3 shows the disposition of the video heads and audio heads mounted on the tape guide drum. The guide drum 15 has a shape of a cylinder, and the magnetic tape is wound spirally around the guide drum 15 in a range of more than 180 degrees. The guide drum 15 is provided with two video heads 16 and 17 spaced out by 180 degrees from each other, and further provided with two audio heads 18 and 19 spaced out by 180 degrees from each other. There is provided an angular displacement of $\alpha$ in the circumferential direction of the guide drum 15 between the video heads 16 and 17 and the audio heads 18 and 19, and in the particular case of FIG. 3, this angular displacement is 90 degrees. The guide drum 15 is rotated by a drum motor in the direction shown by the arrow 20 (counterclockwise direction), and the video heads 16 and 17 and audio heads 18 and 19 rotating with the guide drum 15 scan askew the magnetic tape which is wound around the guide drum 15 so that the video and audio signals are recorded on the tape.

With the video heads 16 and 17 and audio heads 18 and 19 disposed 90-degrees apart from each other as shown in FIG. 3, the recording circuit shown in FIG. 1 first records the frequency-modulated audio signal on the tape 120 with the audio head 18, then records the video signal with the video head 16. In case the first audio head 18 traces the same recording track as of the first video head 16, the video signal is recorded by the first video head over the audio signal recorded by the first audio head 18. Similarly, after the audio signal has been recorded on the tape 120 by the second audio head 19, the video signal is recorded by the second video head 17. By making the first audio and video heads to trace a common recording track and also the second audio and video heads to trace another common recording track, the video and audio signals for one field are recorded on one recording track on a multiplex basis.

In recording the audio and video signals on one recording track (video track) on a multiplex basis, the video signal is recorded over the record of the audio signal which has been recorded in advance, causing the audio signal to be erased by the recording operation for the video signal. Generally, in magnetic recording of signals on the magnetic tape, low-frequency components of the signal are recorded deep in the magnetic layer of the tape, while high-frequency components are recorded on the surface of the magnetic layer. Since the frequency-modulated audio signal is placed in the lowest portion of the lower sideband of the luminance signal 4 as shown in FIG. 2, the audio signal has lower frequency components than those of the luminance signal. Accordingly, the audio signal is recorded to the deeper portion of the magnetic layer as compared with the video signal, and the video signal is recorded on the surface of the magnetic layer. Although the audio signal is partly erased by the recording of the video signal on the same track, this occurs only in the surface section of the magnetic layer and the majority of audio signal recorded deep in the magnetic layer is not erased. Instead, erasure of audio signal recorded in the surface section of the magnetic layer conveniently reduces the interference of the audio signal with the video signal.

Thus, by recording the audio signal on the video track using a rotary audio head independent of the video head, the higher relative speed between the recording head and magnetic tape can be obtained and a slower tape speed can be achieved without impairing the quality of reproduced sound. What must be noted here is that the recording track traced by the audio head must be coincident with the recording track which will be traced subsequently by the video head, or otherwise the audio and video heads should be arranged to trace separate recording tracks. This is for the purpose of preventing the recorded video signal from being erased by the recording of the audio signal. In case the tape speed is much lowered to an extent of adjacent video tracks coming in contact with each other so as to perform high density recording, it is desirable for the audio head and video head to trace the same recording track.

Figure 4:
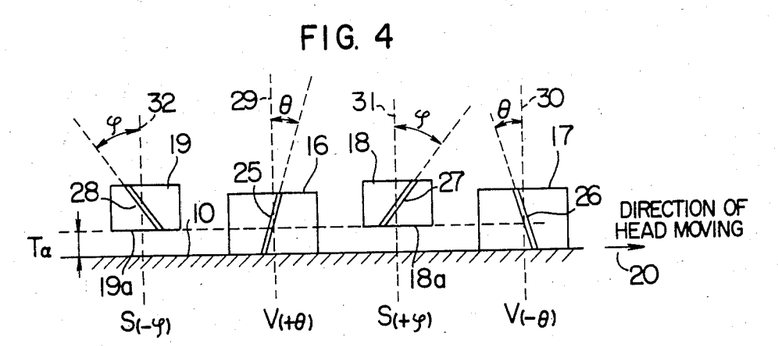
FIG. 4 is a development of FIG. 3.

In case the magnetic tape 120 runs by being wound spirally around the guide drum 15 for more than 180 degrees as shown in FIG. 3, with the first audio head 18 and the first video head 16 being disposed on the same horizontal plane with a spacing of $\alpha$ in angle, for example, the first audio head 18 traces a different track than that traced by the first video head, and same track recording cannot be achieved. Therefore, the video heads and audio heads need an offset in the mount position. FIG. 4 is a development of FIG. 3, showing the offset of the audio heads with respect to the video heads. In order for the video head and audio head to trace the same recording track, an offset of $T_\alpha$ is needed between the audio heads 18 and 19 and the video heads 16 and 17 as shown in FIG. 4. Namely, the audio heads 18 and 19 are mounted on the guide drum 15 with a spacing of $T_\alpha$ between the bottom 18a and 19b of the heads and the mount base 10. The value of offset $T_\alpha$ is determined from the angular displacement $\alpha$ between the video head and audio head and the tape speed, and can be calculated by the following equation.

$$T_\alpha = \frac{\alpha}{180°} \times T_P \qquad (1)$$

where $T_P$ is the pitch of video track formed on the magnetic tape 120. For example, for a track pitch of 20 $\mu$m and $\alpha = 90$ degrees, the necessary offset $T_\alpha$ becomes 10 $\mu$m.

Figure 5:
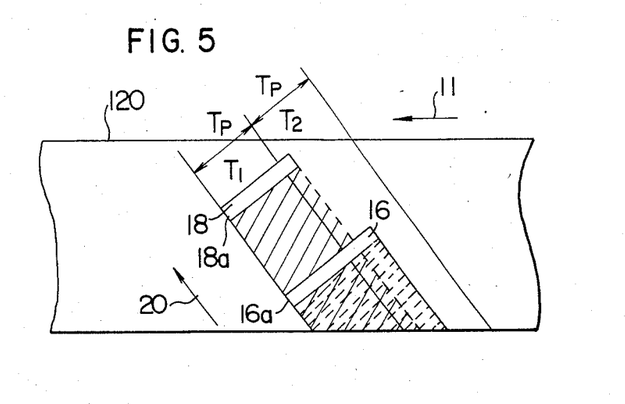
FIG. 5 is an illustration of record patterns used to explain the recording states of the video and audio signals.

FIG. 5 is an illustration showing the patterns of record formed on the magnetic tape for the audio and video signals. The figure shows that the audio signal is recorded by the first audio head 18, and then the video signal is recorded by the first video head 16 over the record of the audio signal. The arrow 20 shows the tracing direction of the heads 16 and 18, and the arrow 11 shows the feed direction of the magnetic tape 120. By provision of the offset $T_\alpha$ between the audio head 18 and the video head 16 as shown in FIG. 4, the lower edge 18a of the audio head 18 and the lower edge 16a of the video head 16 can be positioned coincidentally on the left-hand edge of the video track $T_1$. Since the audio head 18 and video head 16 are made wider than the track width $T_P$ of the video track $T_1$ on the magnetic tape 120, the audio and video signals are recorded beyond the bound of the video track $T_1$ into the adjacent video track $T_2$. However, the signals recorded in the region of the video track $T_2$ are erased when new signals are recorded on it, and no problem arises.

In reproducing the video signal and audio signal which have been recorded as described above, consideration must be made so that the video signal and audio signal do not interfere with each other. For example, when reproducing the video track $T_1$ of FIG. 5, the video signal on the video track $T_1$ must be protected from interference by the audio signal recorded on the same track and also from crosstalk by the audio signal recorded on the adjacent video track $T_2$. Similarly, the audio signal on the video track $T_1$ must be protected from interference by the video signal recorded on the same track and the audio signal recorded on the adjacent track $T_2$.

The magnetic recording and reproduction system of the helical scanning type uses two video heads alternately to record the video signal of each field on one video track. In order to reduce crosstalk of video signal from the adjacent video track in the reproducing operation, the gap of the video head is made to have an inclination at certain angle with respect to the direction of tracing, i.e., the azimuth angle. The two video heads have opposite azimuth angles of gap so that the video signal from the adjacent track is attenuated by the azimuth loss, thereby preventing the crosstalk interference. In recording the audio signal and video signal on one video track, it is also possible to prevent the crosstalk interference between the video and audio signals by providing different azimuth angles for the video and audio heads.

Figure 7:
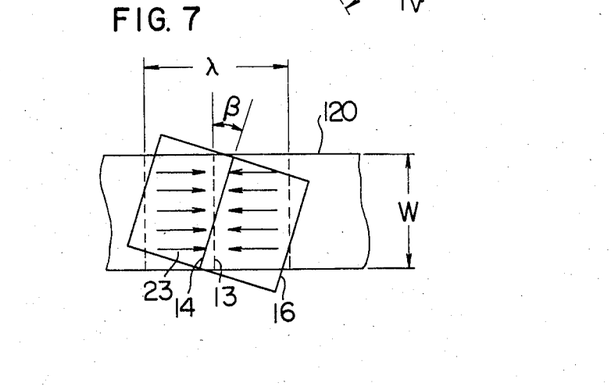
FIG. 7 is a diagram showing the positional relation between the magnetic tape and the head used to explain the azimuth loss.

FIG. 7 is an illustration used to explain the azimuth loss which occurs when the tape signal is reproduced with a head having a different azimuth angle than that of the recording head. Namely, a signal with a wavelength of $\lambda$ is recorded at a width of W on the magnetic tape 120 in the direction shown by the arrow 23, and the signal is reproduced by the magnetic head 16 with its gap inclined by an angle of $\beta$. That is, when a signal with a wavelength of $\lambda$ is recorded on the magnetic tape 120, with the recording head 16 having a gap normal to the longitudinal direction of the tape 120 (the gap is shown by the dashed line 13), the recorded signal produces a magnetic flux in the direction shown by the arrow 23. When the signal is reproduced by the head 16 with its gap inclined by an angle of $\beta$ from the state of recording (the gap at reproduction is shown by the solid line 14), the reproduction output is partly lost due to the inclination of the gap. This loss, as will be symbolized by L, is generally called "azimuth loss", and is expressed in terms of the recording wavelength $\lambda$ of recording signal, the recording track width W, and the azimuth angle $\beta$ as follows.

$$L = 20 \log \frac{\sin\left(\frac{\pi W}{\lambda} \cdot \tan \beta\right)}{\frac{\pi W}{\lambda} \tan \beta} \text{ [dB]} \qquad (2)$$

Figure 8:
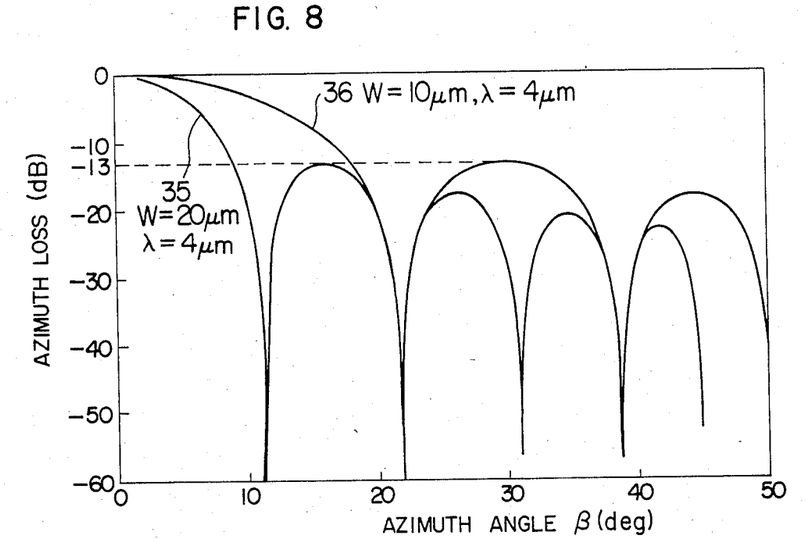
FIG. 8 is a graph showing the azimuth angle vs. azimuth loss characteristics.

The azimuth loss L increases when the recording wavelength is made shorter, the recording track width is made wider, or the azimuth angle $\beta$ is made larger, as can be seen from Equation (2). For example, FIG. 8 is a plot of the azimuth loss against the azimuth angle for a recording wavelength of 4 μm (at a relative speed of 5.8 m/sec between the tape and head, and a recording signal frequency of 1.45 MHz) and a recording track width W of 10 μm and 20 μm. As shown in the figure, a large azimuth loss is obtained at the azimuth angle of about $\beta=11$ degrees when the recording wavelength is 4 μm and the track width of W=20 μm, while a large azimuth loss is obtained again at about $\beta=22$ degrees when the recording track width is W=10 μm for the same recording signal. Accordingly, in order to reduce the interference between the audio and video signals, the azimuth angle of the heads should be determined such that a large azimuth loss is created for the interfering signal. Audio signal interfering with video signal is not only the audio signal recorded on the same track as of the video signal, but the audio signal recorded on the adjacent track can also interfere. As shown in FIG. 5, the track width of the video head 16 and audio head 18 is selected to be wider than the pitch Tp of the video track $T_1$. On this account, when one track $T_1$ is reproduced, the video and audio signals on the adjacent track $T_2$ is partly reproduced, that can be the interfering signal to the wanted video and audio signals. The azimuth loss varies depending not only on the azimuth angle $\beta$, but also on the recording track width W, i.e., the larger the recording track width, the larger azimuth loss will result.

When the video and audio heads trace the video track correctly without the tracking error, both heads trace a small part of the track width of the adjacent track. In order to provide a large azimuth loss for the signal recorded on the adjacent track, a large azimuth angle for that signal is needed. That is, the video and audio heads may have a small azimuth angle for the currently scanning track because of a sufficiently large recording track width traced by the heads, but must have a large azimuth angle for the adjacent track providing a small recording track for the heads.

FIG. 4 shows the inclination of gap of the video heads 16 and 17 and the audio heads 18 and 19. The first video head has a gap referred to by 25. The gap 25 has a clockwise inclination of $\theta$ with respect to the line 29 perpendicular to the head mount plane 10. Defining a clockwise inclination to be positive, the gap 25 is said to have an azimuth angle of $+\theta$. The signal recorded by the first video head 16 with an azimuth angle of $+\theta$ will be symbolized as $V(+\theta)$. On the other hand, the gap 26 of the second video head 17 has an inclination of $\theta$ counterclockwise with respect to the normal 30, i.e., an azimuth angle of $-\theta$. The signal recorded by the video head 17 with this azimuth angle will be symbolized as $V(-\theta)$.

Figure 6:
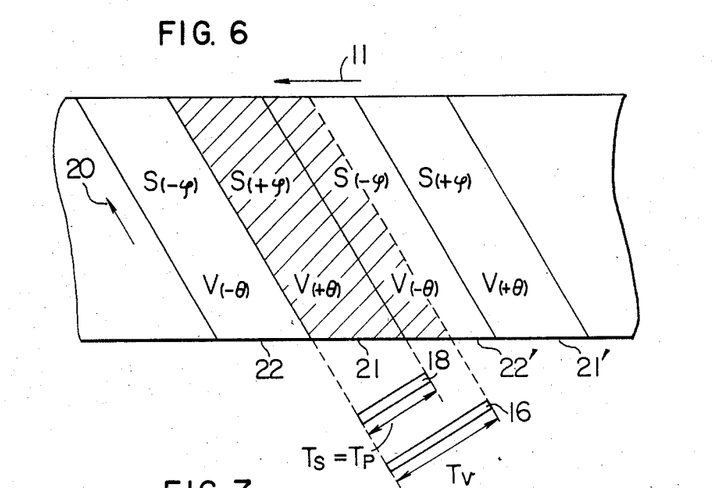
FIG. 6 is an illustration of record patterns of the video and audio signals recorded by the inventive magnetic recording and reproduction system.

The first audio head 18 has a gap 27 with a clockwise inclination of $\phi$ degree with respect to the normal 31, while the second audio head 19 has a counterclockwise inclination of $\phi$ with respect to the normal 32. Thus, the gap 27 of the first audio head 18 is said to have an azimuth angle of $+\phi$, while the gap 28 of the second audio head 19 has an azimuth angle of $-\phi$. The signals recorded by the respective audio heads will be symbolized as $S(+\phi)$ and $S(-\phi)$. FIG. 6 shows the patterns of record created when the video and audio signals are recorded on the magnetic tape by the video heads 16 and 17 and audio heads 18 and 19 arranged as described above. This figure shows the case of high-density recording by feeding the magnetic tape at a low speed to an extent that the adjoining video tracks come to contact with each other. Namely, the track pitch is about Tp=20 μm, the track width of video heads 16 and 17 is about Tv=30 μm, and the track width of audio heads 18 and 19 is about Ts=20 μm.

Signals recorded on video tracks 22 and 22' include the audio signal $S(-\phi)$ recorded by the second audio head 19 and the video signal $V(-\theta)$ recorded by the second video head 17, and these signals are recorded to form overlaping patterns as shown in FIG. 5. Signals recorded on video tracks 21 and 21' include the audio signal $S(+\phi)$ recorded by the first audio head 18 and the video signal $V(+\theta)$ recorded by the first video head 16. The audio signal $S(+\phi)$ and video signal $V(+\theta)$ recorded on the video track 21 are the signals recorded with azimuth angles of $+\phi$ and $+\theta$, respectively, each angle being a clockwise inlination. Similarly, the audio signal $S(-\phi)$ and video signal $V(-\theta)$ recorded on the video track 22 are the signals recorded with azimuth angles of $-\phi$ and $-\theta$, respectively, each angle being a counterclockwise inclination. Thus, the audio signal and video signal recorded on one video track have the same polarity of inclination, though they have different values of azimuth angle. This characteristic will be termed co-polarity azimuth. On the other hand, the signal recorded on the video track 21 has a clockwise inclination of azimuth angle, whereas the signal recorded on the video track 22 has a counterclockwise inclination of azimuth angle, and they have the opposite inclination of azimuth angle. This characteristic will be termed anti-polarity azimuth. By virtue of these characteristics, crosstalk of audio signals from adjacent video tracks can sufficiently be attenuated in the reproducing operation.

Referring to FIG. 6, reproduction of video track 21 by the video head 16 with an azimuth angle of $+\theta$ will be described. When the video head 16 traces the video track 21 for reproduction, it is sensitive to the video signal recorded on the video track 21 and also to the audio signal recorded on the same track. The audio signal is recorded with an azimuth angle of $+\phi$, while the reproducing video head has an azimuth angle of $+\theta$, i.e., co-polarity azimuth, but different values of angle, and therefore the audio signal is attenuated by virtue of the azimuth loss. The azimuth loss in reproducing the audio signal recorded on the same track, as will be symbolized by $L_+$, can be expressed in terms of the recording track width for the audio signal, Ts; the azimuth angle for the audio signal, $\phi$; and the azimuth angle of the video head, $\theta$, as follows.

$$L_+ = 20 \log \frac{\sin\left[\frac{\pi T_s}{\lambda} \tan(\phi - \theta)\right]}{\frac{\pi T_s}{\lambda} \tan(\phi - \theta)} \tag{3}$$

The audio signal recorded on the video track 21 and the video head 16 sensitive to this signal are in the relation of co-polarity azimuth, and although the video head 16 has a smaller azimuth angle for the audio signal, a sufficient azimuth loss is obtained due to a large track width (20 μm) of the audio signal.

When the video head 16 traces the video track 21 for reproduction, the head 16 having a width Tv larger than the track pitch Tp traces a part of the adjacent video track 22' and reproduces the audio signal recorded on the track 22'. In this case, however, the audio signal on the adjacent track 22' is recorded with an azimuth angle of $-\phi$ as opposed in polarity to the azimuth angle of the video head 16, resulting in an increased azimuth angle of the video head 16 for the audio signal. Consequently, although the track width of the adjacent video track 22' traced by the video head 16 is small, a large azimuth angle of the video head 16 for the audio signal provides a large azimuth loss to attenuate the reproducing audio signal sufficiently. The azimuth loss of the audio signal recorded on the adjacent video track, as will be symbolized by $L_-$, can be expressed as follows.

$$L_- = 20 \log \frac{\sin\left[\frac{(T_v - T_s)}{\lambda} \tan(\phi + \theta)\right]}{\frac{(T_v - T_s)}{\lambda} \tan(\phi + \theta)} \quad (4)$$

The azimuth losses $L_+$ and $L_-$ of the audio signal are plotted in FIG. 8 for the recording conditions in FIG. 6 of: the recording wavelength of audio signal, $\lambda = 4$ μm; the track width of audio head, $Ts = 20$ μm; and the track width of video head, $Tv = 30$ μm. In FIG. 8, the curve 35 represents the azimuth loss $L_+$ of the audio signal recorded on the video track 21 with a track width of $Ts = 20$ μm, while the curve 36 represents the azimuth loss $L_-$ of the audio signal recorded on the adjacent track 22' with a track width of $Tv - Ts = 10$ μm. As shown by the curve 35 of FIG. 8, the azimuth loss $L_+$ has a peak at the azimuth angle of about $\beta = 11$ degrees, and the azimuth loss $L_-$ has a peak at about $\beta = 22$ degrees as shown by the curve 36. Accordingly, when the azimuth angle of the video heads is set to $\pm 6$ degrees which is equal to the azimuth angle of the conventional household magnetic recording and reproduction apparatus, the azimuth angle for the audio signal providing the maximum azimuth loss $L_+$ becomes 17 degrees, and the azimuth angle for making the $L_-$ maximum becomes 16 degrees. This condition can be realized by choosing the azimuth angle of the audio heads, $\pm \phi$, to be $\pm 16.5$ degrees.

Generally, the track width of a video head (including an audio head) is made as accurate as 30 μm $\pm 2$ μm. By the adjustment of tracking during reproduction, the video head having such a variation in the track width can trace the recording track Ts accurately without causing a significant variation in the track width. However, this head variation is directly reflected on the scanning width of the adjacent track, causing the azimuth loss to vary in accordance with Equation (2), thus resulting in an impaired picture quality.

Figure 9:
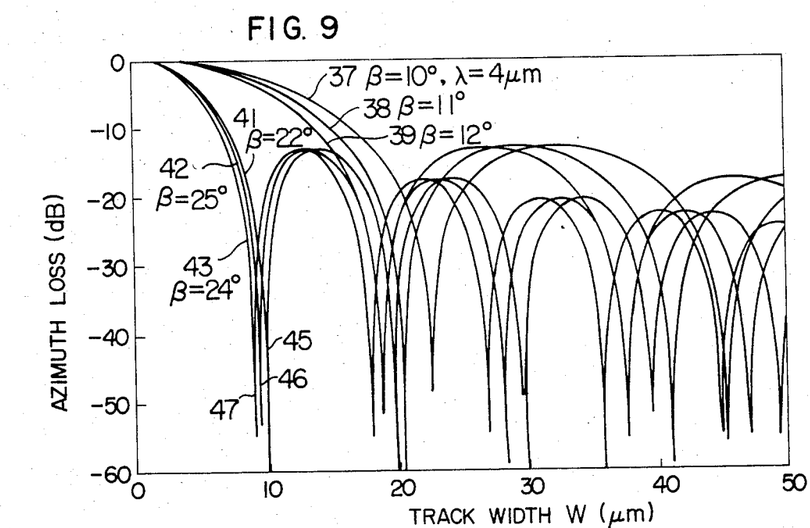
FIG. 9 is a graph showing the track width vs. azimuth loss characteristics.

FIG. 9 shows the relationship between the track width W and the azimuth loss L for the recording wavelength of $\lambda = 4$ μm. In the figure, the curves 37, 38 and 39 represent the azimuth loss for the azimuth angle of $\beta = 10$, 11 and 12 degrees, respectively, and the curves 41, 42 and 43 represent the azimuth loss for the azimuth angle of $\beta = 22$, 23 and 24 degrees. As shown in FIG. 9, a slight variation in the track width W causes a large variation of the azimuth loss. Therefore, the variation in the track width of video heads due to the manufacturing process results in the variation of the azimuth loss of the audio signal on the adjacent video track during the reproduction operation, and interfering signals from the adjacent tracks will not be attenuated sufficiently in some cases. On this account, a relative azimuth angle between the audio signal and the video head should be chosen so that a sufficient azimuth loss is obtained even if the track width of video heads has a variation due to the manufacturing process. As shown by the curves 41, 42 and 43 of FIG. 9, the first peaks 45, 46 and 47 of the curves move to the left on the graph as the azimuth angle $\beta$ increases. Accordingly, by choosing the relative azimuth angle between the audio signal on the adjacent track and the video head to be 22 degrees or more, an azimuth loss larger then $-13$ dB can be obtained even if the track width of video heads varies. In FIG. 8, the curve 35 indicating the azimuth loss $L_+$ for the track width of 20 μm has peaks at the azimuth angle of about $\beta = 11$ and 22 degrees, and the curve 36 indicating the azimuth loss $L_-$ for the track width of 10 μm has peaks at about $\beta = 22$ and 39 degrees. Accordingly, by choosing the azimuth angle $\beta$ between 22 and 39 degrees, the azimuth loss of a minimum of $-13$ dB can be obtained, whereby the interference of audio signal with video signal can be avoided and the interference of video signal with audio signal can also be avoided. In order to make the relative azimuth angle of $\beta = 22$ degrees between the audio signal and the video heads, with their gap having azimuth angles of $\pm 6$ degrees and with invaried track width of being 20 μm, the azimuth angles of the audio heads are determined to be $\pm 28$ degrees. In this case, the relative azimuth angle between the audio signal on the adjacent video track and the video head becomes 34 degrees, that is plotted between the first and second peaks of the curve 36, and the azimuth loss of larger than $-13$ dB can be obtained. The track width of the adjacent video track being sensed is 10 μm, which is half that of the normal video track, causing the reproduced video signal to have a small signal level, and an effective azimuth loss of larger than $-19$ dB can be obtained.

By choosing the azimuth angle of the video and audio heads appropriately as described above, interference between the video and audio signals can be minimized, and the video and audio signals can be recorded on the same video track. Accordingly, even though the system is operated at a low tape speed to achieve a higher recording density, a large relative speed between the audio head and the magnetic tape allows high-quality recording and reproduction for the audio signal.

Figure 10:
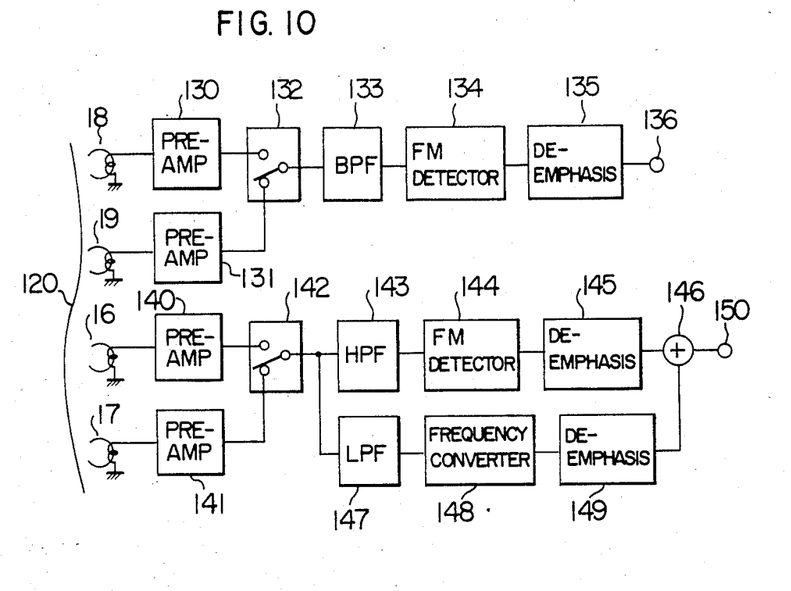
FIG. 10 is a block diagram showing the reproduction circuit in the inventive magnetic recording and reproduction system.

FIG. 10 is a block diagram showing the reproducing circuit in the inventive magnetic recording and reproduction system, where the first and second video heads 16 and 17 and the first and second audio heads 18 and 19 are the same heads used in the recording operation. In reproducing operation, as in recording operation, the first video track on the magnetic tape 120 is first reproduced by the first audio head 18, and then by the first video head 16. Subsequently, the second video track is reproduced by the second audio head 19, and then by the second video head 17. The video track reproduced by the first audio head 18 and the first video head 16 is the same track which has been traced by these heads 18 and 16 in recording operation. Similarly, the video track reproduced by the second audio head 19 and the second video head 17 is the same track which has been traced by these heads 19 and 17 in recording operation. On this account, no azimuth loss is created by the video heads in reproducing the video signal recorded on the tape, and also no azimuth loss is created by the audio heads in reproducing the audio signal. On the other hand, the video and audio heads have relations of anti-polarity azimuth with the video and audio signals, respectively, recorded on the adjacent track, thereby providing a large azimuth loss.

The first and second audio heads 18 and 19 operate alternately for every two fields of the television signal to reproduce audio signals from separate video tracks on the magnetic tape 120. Although the audio heads 18 and 19 are also sensitive to the video signal when reproducing the audio signal, the video signal components are attenuated significantly by the azimuth loss due to the difference of the azimuth angle for the recorded video signal from the azimuth angle of the audio heads 18 and 19. The residual video signal components will be eliminated by a band-pass filter 133 located in the following stage.

The audio signals reproduced by the audio heads 18 and 19 are amplified by respective preamplifiers 130 and 131, and then fed to a head switching circuit 132. The head switching circuit 132 operates in synchronization with the switching of the audio heads 18 and 19 to select the output signals from the preamplifiers 130 and 131 alternately, and supplies the signal to a band-pass filter 133. The band-pass filter 133 is tuned to the center frequency of the carrier signal of the frequency-modulated audio signal, passing only the upper and lower sideband signals of the frequency-modulated audio signal so as to eliminate the video signal components reproduced together with the audio signal. The audio signal passing through the band-pass filter 133 is fed to a frequency demodulator 134 for demodulation. Then, the demodulated audio signal is conducted through a de-emphasis circuit 135 so that noises included in high-frequency components are attenuated, and then delivered to an output terminal 136.

The first and second video heads 16 and 17 trace separate video tracks alternately for every two fields in the same way as of the audio heads, and reproduce the video signal. Both video heads have different azimuth angles from that of the audio signal, and the audio signal components reproduced by the video heads are attenuated significantly by virtue of the azimuth loss. Accordingly, the reproduced video signal includes little audio signal components, and further the residual audio signal components will be eliminated by a high-pass filter 143 and low-pass filter 147 located in the following stage. The video signals reproduced by the video heads 16 and 17 are amplified by respective preamplifiers 140 and 141, and then fed to a head switching circuit 142. The head switching circuit 142 operates at timings of the video heads 16 and 17 coming to contact with the magnetic tape 120 alternately to select one of the outputs from the preamplifiers 140 and 141 alternately. The video signal passing through the head switching circuit 142 is supplied to a high-pass filter 143 and low-pass filter 147. The high-pass filter 143 extracts the frequency-modulated luminance signal from the video signal and eliminates the chrominance signal and audio signal components. The low-pass filter 147 extracts the chrominance signal from the video signal and eliminates the luminance and audio signal components. The luminance signal extracted by the high-pass filter 143 is demodulated by a frequency demodulator 144, and then conducted through a de-emphasis circuit 145 to a summing circuit 146. The chrominance signal extracted by the low-pass filter 147 is supplied to a frequency converter 148, by which the frequency of the chrominance subcarrier is converted back to the original high frequency, and the signal is conducted through a de-emphasis circuit 149 to the summing circuit 146. The circuit 146 sums the luminance signal and chrominance signal to produce a composite color television signal and delivers the signal to an output terminal 150.

Figure 11:
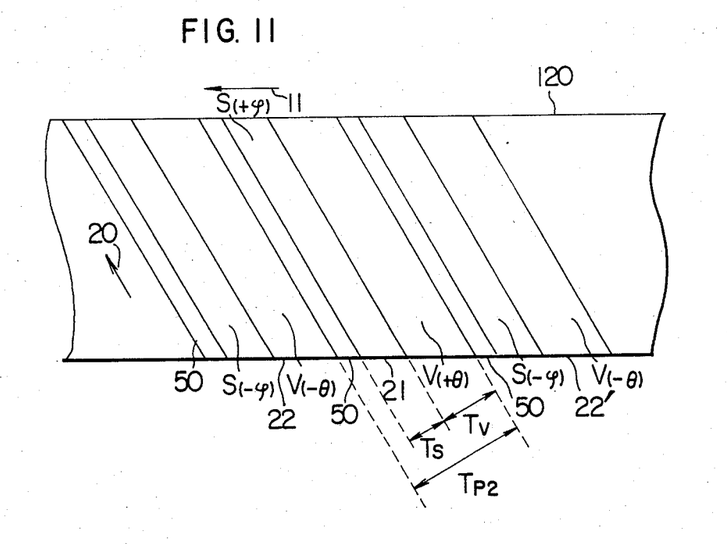
FIG. 11 is an illustration of record patterns of the video and audio signals recorded at the standard tape speed.

FIG. 11 shows the pattern of record when the foregoing heads are used for recording at the higher tape speed of the standard mode. Due to the offset $T_\alpha$ between the video head and audio head, the recording track 21 for the audio signal $S(+\phi)$ and video signal $V(+\theta)$ does not coincide with the recording tracks 22 and 22', for the audio signal $S(-\phi)$ and video signal $V(-\theta)$. Namely, the difference of the track pitch $T_{P2}=60$ μm and the video head width $T_V=30$ μm produces an intertrack guard band 50, and the audio signal is recorded on the 20 μm-track within the guard band. Accordingly, crosstalk does not occur between the audio and video signals in this operating mode irrespective of the azimuth loss.

Although the video tape recorder of the VHS system handling NTSC signals have been described, it will be appreciated that the same effects are achieved for video tape recorders of other system.

According to the present invention, as described above, a satisfactory sound quality can be reproduced without impairing the picture quality. Particularly, the inventive system is significantly effective for recording in stereo and bi-linguistic modes.

We claim:

1. A magnetic recording and reproduction system in which a frequency-modulated luminance signal, a chrominance signal placed in a frequency band below a frequency band of said luminance signal, and a frequency-modulated audio signal placed in the frequency band of said luminance signal are recorded on a video track of a magnetic tape with a low speed such that adjacent video tracks contact each other and, thereafter, the recorded signals are reproduced from said tape, said system comprising:

first and second video heads for recording and reproducing said luminance signal and said chrominance signal, said heads having gaps with azimuth angles in opposite inclination directions;

first and second audio heads for recording and reproducing said audio signal, said heads having gaps with azimuth angles in opposite inclination directions, and in different values of azimuth angle from those of said video heads;

a rotary member which mounts said video heads and said audio heads, and causes said video and audio heads to trace said video track of said magnetic tape;

means for operating on said first audio head and said first video head to trace a first video track;

means for operating on said second audio head and said second video head to trace a second video track;

the gap of said first audio head and said first video head having azimuth angles in a same inclination direction and the gaps of said second audio head and said second video head having azimuth angles in a same inclination direction so that the audio signal and the luminance signal are recorded on each of said video tracks with azimuth angles in a same inclination direction and the recorded signals recorded by said first and second video heads have azimuth angles in opposite inclination directions, said first and second audio heads being adapted to trace said video track in advance of said first and second video heads, respectively.

2. A magnetic recording and reproduction system according to claim 1, wherein said first and second audio heads have azimuth angles larger than those of said first and second video heads.

3. A magnetic recording and reproduction system according to claim 1, wherein said first and second audio heads are mounted on said rotory member with a spacing of 180 degrees from each other, and said first and second video heads are mounted on said rotary member with a spacing of 180 degrees from each other, said first and second audio heads being offset from said first and second video heads by the amount of $(\alpha/180) \times T_p$, where $\alpha$ represents the angle between said audio heads and said video heads, and $T_p$ represents the track pitch of said video track.

* * * * *